United States Patent [19]

Musits et al.

[11] 4,455,044

[45] Jun. 19, 1984

[54] TOOL FOR PICKING UP AND INSERTING DIFFERENT LENGTH BOLTS

[75] Inventors: Bela L. Musits, Tolland, Conn.; Frank A. DeSantis, Delanson, N.Y.

[73] Assignee: General Electric Company, Schenectady, N.Y.

[21] Appl. No.: 264,914

[22] Filed: May 18, 1981

[51] Int. Cl.³ .............................................. B25B 27/00
[52] U.S. Cl. ................................... 294/113; 294/115; 414/729
[58] Field of Search ............... 414/626, 751, 618, 621; 254/18; 81/451, 454, 455; 294/113, 115; 29/700

[56] References Cited

U.S. PATENT DOCUMENTS

| 1,575,149 | 3/1926 | Craig et al. | 81/455 |
| 3,397,907 | 8/1968 | Trowbridge | 294/113 X |
| 3,710,835 | 1/1973 | Eby | 81/455 |
| 4,140,161 | 2/1979 | Russo et al. | 81/451 |

FOREIGN PATENT DOCUMENTS 286624  1/1971  U.S.S.R. ................. 81/455

OTHER PUBLICATIONS

A. W. Case, Jr., "An Interpretive Controller for Robotic Assembly", Technical Paper MS 80-743, Society of Manufacturing Engineers, 1980.

J. S. Albus et al., "Robot Systems", Scientific American, vol. 234, No. 2, Feb. 1976, pp. 76–86B.

J. L. Nevins et al., "Computer-controlled Assembly", Scientific American, vol. 238, No. 2, Feb. 1978, pp. 62–74.

G. G. Dodd et al., ed., "Computer Vision and Sensor-Based Robots", Plenum Press, New York, 1979, pp. 117–136.

*Primary Examiner*—Robert J. Spar
*Assistant Examiner*—Donald W. Underwood
*Attorney, Agent, or Firm*—Donald R. Campbell; James C. Davis, Jr.; Paul R. Webb, II

[57] ABSTRACT

The pickup and insert tool is used during the automated assembly of small motors and other products that require tie bolts, screws, and similar fasteners. Different length tie bolts are handled without adjusting the tool. The fastener is picked up from a holder and held between a pair of spring loaded jaws. The motion to insert the tie bolt is provided by a movable rod which also accommodates the different lengths of the bolts.

7 Claims, 10 Drawing Figures

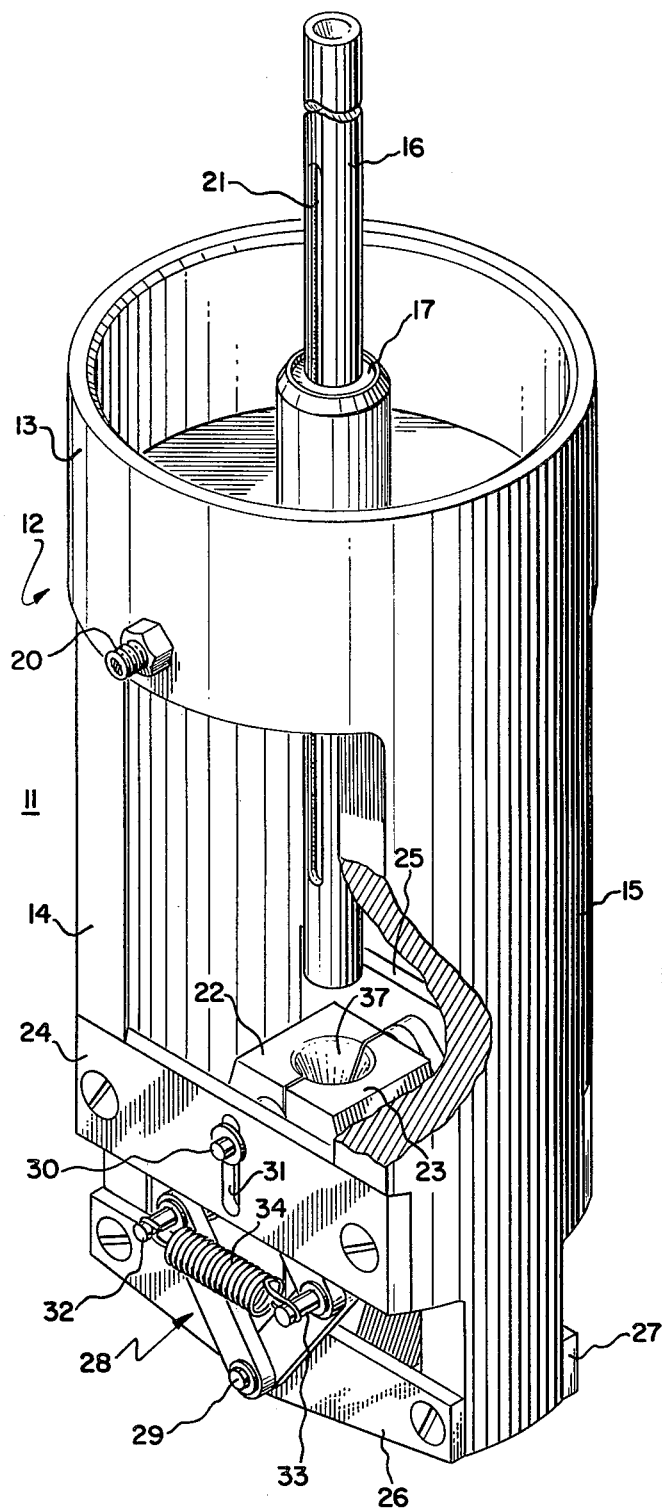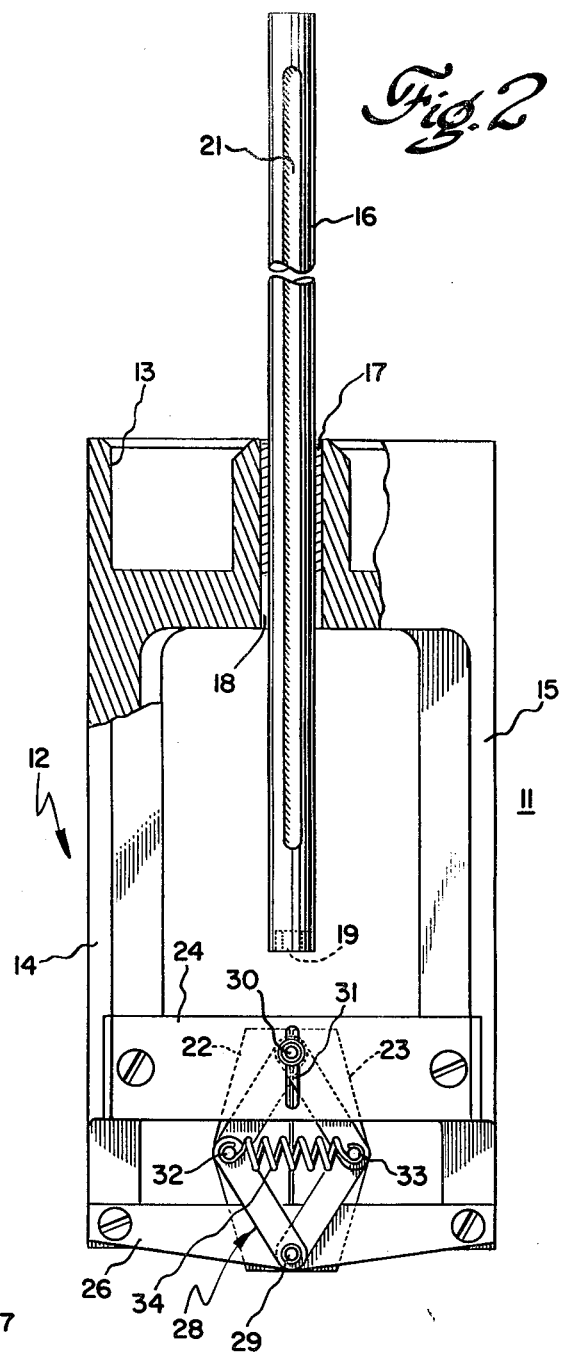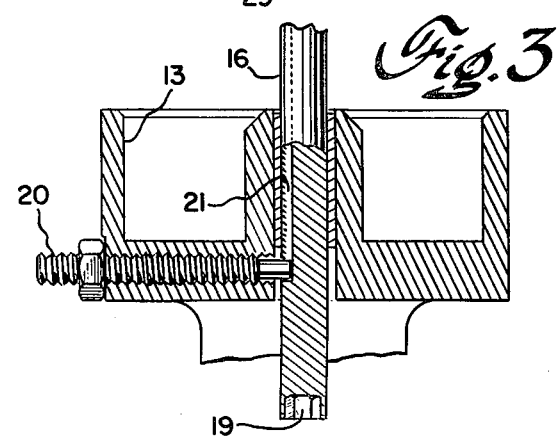

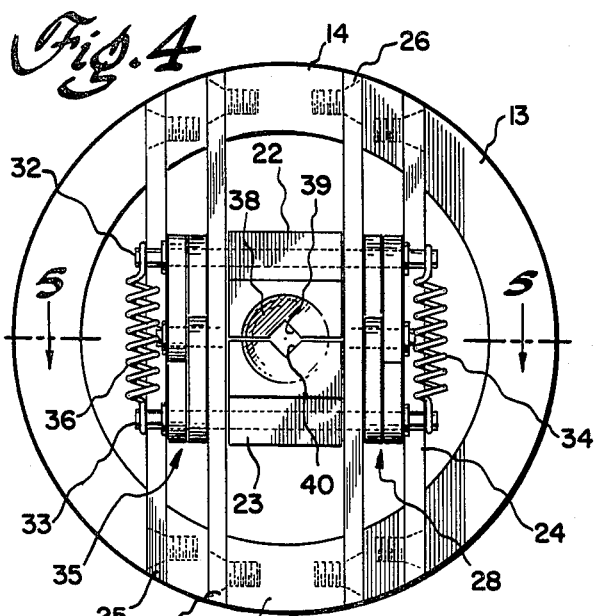

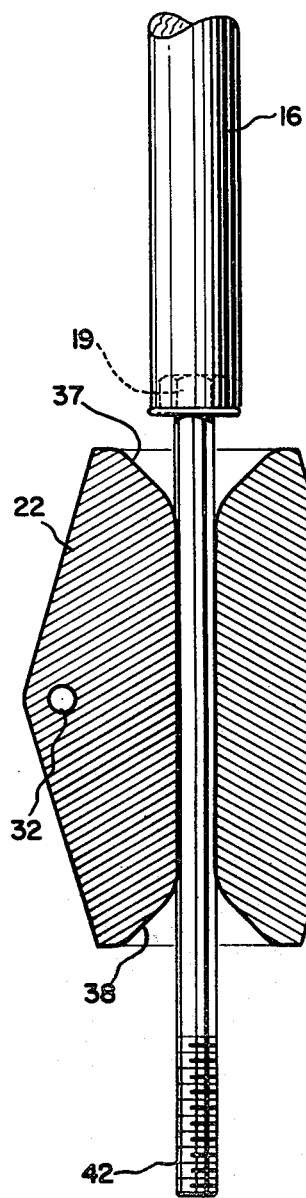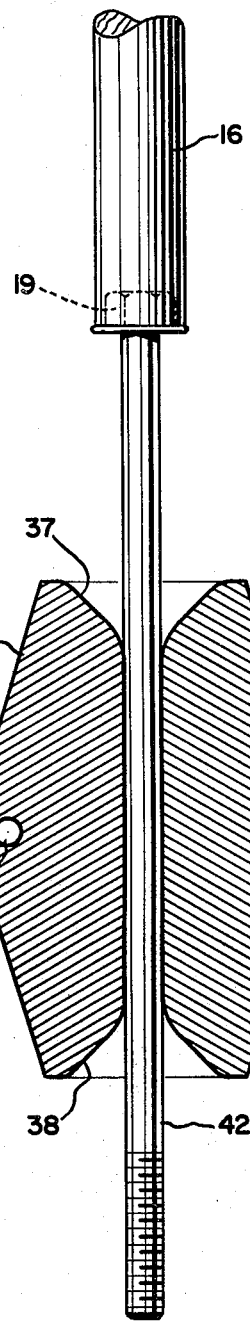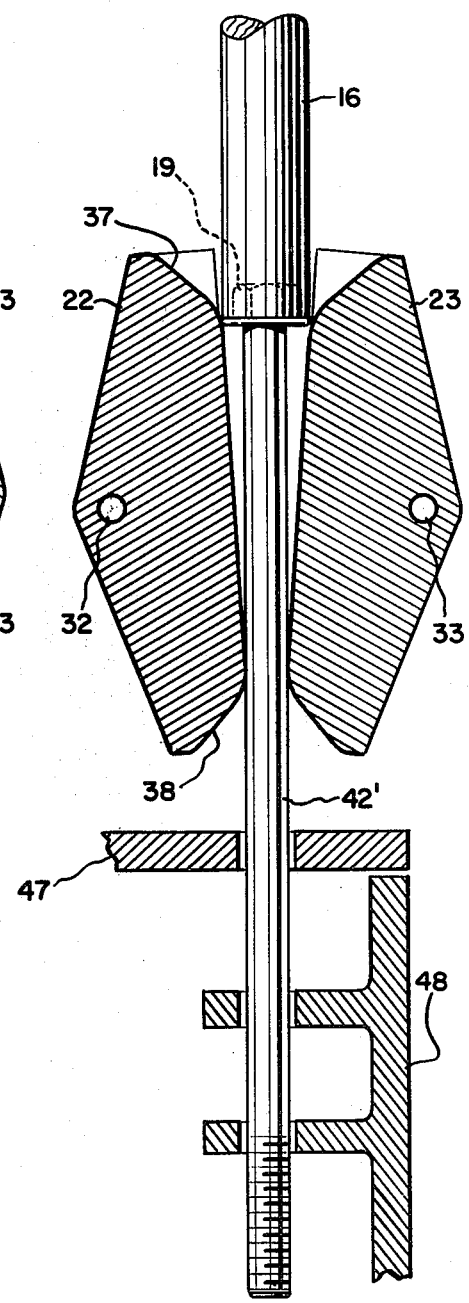

//////4,455,044//////

TOOL FOR PICKING UP AND INSERTING DIFFERENT LENGTH BOLTS

BACKGROUND OF THE INVENTION

This invention relates to a tool and system, especially for an automatic assembly machine, that picks up and inserts different length fasteners.

During the assembly process, tie bolts must often be inserted into their proper locations. In a batch process, different models are required to be assembled; these models often have different length tie bolts. Fractional horsepower motors, for instance, are manufactured in various sizes by batches. Tie bolts are dropped down through holes in the end shields and through holes in flanges on the stator housing. The bolts are held from turning from above and drive sockets, into which screw fastener nuts have been dispensed, are rotated. A tool that has the flexibility to pick up and insert the different length tie bolts would be very useful. This flexibility eliminates tool changes and the resultant time savings would benefit any mixed model assembly line.

SUMMARY OF THE INVENTION

The pickup and insert tool which handles different length fasteners such as bolts and screws is comprised of a tool housing, a sliding push rod with a socket at its lower end to accept the head of a fastener, and a pair of spring loaded jaws. The jaws are mounted on the housing, below the sliding rod, to open and close and have limited swinging movement so as to pick up and hold the shank of the fastener between the spring loaded jaws. The fastener is pushed down through the jaws and inserted into an assembly in response to movement of the sliding rod toward and between the jaws. The length of the housing and sliding rod govern the length of the longest fastener to be handled.

The illustrative embodiment is a programmed assembly machine that picks up and inserts tie bolts of many lengths. The robotic machine has a gripper or "hand" equipped with a retractable actuator, and the system includes a holder loaded with tie bolts. The tool is picked up by the gripper and placed over the holder, then moved downwardly to pick up the fastener which is held between the spring loaded jaws wile it is moved to the insertion location. The actuator pushes the sliding rod/wrench toward and between the jaws, which have beveled surfaces at both ends and V-shaped grooves, to insert the tie bolt into an assembly. The tie bolt is held from above as a nut is threaded and tightened.

BRIEF DESCRIPTION OF THE DRAWINGS

FIG. 1 is a perspective of the tie bolt pickup and insert tool;

FIG. 2 is a front view and partial cross section of the tool;

FIG. 3 is a partial cross section of the gripper drum showing the sliding rod keyway and lock screw;

FIG. 4 is a bottom view of the tool;

FIG. 5 is a vertical cross section through the jaws and parallelogram linkages taken approximately on line 5—5 in FIG. 4;

FIG. 6 is a side view of the tool held by the gripper and picking up a tie bolt from the holder;

FIG. 7 is a fragmentary side view of the gripper, actuator pin, and sliding rod;

FIGS. 8 and 9 illustrate different length tie bolts held by the spring loaded jaws with the bolt head in the wrench end of the movable rod; and FIG. 10 shows the sliding rod and spring loaded jaws as the tie bolt is inserted.

DESCRIPTION OF THE PREFERRED EMBODIMENT

Referring to FIGS. 1-3, the bolt pickup and insert tool 11 has a tool housing 12 that is comprised of a gripper section or drum 13, by which the tool is picked up and moved from one location to another by an expandable chuck type gripper, and a pair of depending arms 14 and 15. A push rod/wrench 16 is slidably and non-rotatably mounted in the housing at the center of gripper section 13. Movable rod 16 is slidable within a bushing 17 in the central bore 18, and has a socket 19 at its lower end which accepts the head of the tie bolt. A lock screw 20 in gripper section 13 enters a longitudinally extending keyway 21 in movable rod 16 and is adjustable radially for clearance so the rod can slide freely up and down. Rod 16 holds the head of the tie bolt while the nut is threaded and tightened from below, and has just enough rotation to orient to the bolt head as the tie bolt is picked up.

A pair of spring loaded jaws 22 and 23 are mounted on the tool housing to open and close and to have limited swinging movement so as to pick up and hold the tie bolt until it is inserted by push rod 16. Movable pin guides 24 and 25 are attached at either end to housing arms 14 and 15, and below them the fixed pin guides 26 and 27. A parallelogram linkage 28 at one side of jaws 22 and 23 is pivoted at the bottom to a fixed pin 29 on bar 26 and, at the top, to a pin 30 that moves vertically guided by a slot 31 in bar 24. At the remaining corners of the diamond, pivot pins 32 and 33 respectively pass through bores in jaws 22 and 23 and are connected by a spring 34 which holds the two jaws in closed position. At the other side of the two jaws (see FIGS. 4 and 5) is an identical parallelogram linkage 35, and a spring 36 connects together the far ends of pivot pins 32 and 33.

As sliding push rod 16 moves down between the jaws to insert the tie bolt or to pick up a fastener, the spring loaded jaws 22 and 23 are forced apart and movable pin 30 slides down in guide slot 31 (and the corresponding components at the other side have the same motion) as the parallelogram linkages 28 and 35 expand widthwise. At the top and bottom of jaws 22 and 23 are beveled surfaces 37 and 38 to facilitate entrance of the push rod or tie bolt, and opposing V-shaped grooves 39 and 40 in the contacting jaw surfaces receive the shank of the tie bolt and center the bolt when it is picked up.

This tool is able to handle tie bolts of many lengths. The length of tool housing 12 and sliding push rod 16 govern the length of tie bolts that can be picked up and inserted with this tool. Sliding rod 16 is used for inserting the tie bolt and acommodating the change in apparent length of the bolt during the threading and nut tightening operation. The invention can be used for the pick up and insertion of tie bolts during the manual or automated assembly of any parts or product that requires bolts, screws, or similar fastening devices.

The picking up of a tie bolt on an automated assembly machine is illustrated in FIG. 6. Pickup and insert tool 11 when not in use is stored in a rack at the side of the assembly fixture base plate of the robotic machine, and elsewhere on the base plate is a bolt holder 41 which has been previously loaded with several tie bolts 42. The tie bolts stand vertically in the holder, bolt head up. At the proper time during assembly of the small motor, tool 11 is picked up by the "hand" of the programmed assembly machine which is typically a pneumatically operated, split-finger expandable chuck gripper 43 that is movable, upon command, up and down in the x and y directions. Referring also to FIG. 7, the gripper has a double-beveled centering and actuator pin 44 that is moved downward by a one-direction air piston. The end of pin 44 is received in a recess 45 in the upper end of sliding push rod 16, and the pin and push rod are moved downward by the air piston on command. During the bolt pickup operation, sliding rod 16 is pushed upwardly and pin 44 and the top end of rod 16 retract upwardly into the gripper 43. At the end of the insertion operation, the sliding rod 16 is between spring loaded jaws 22 and 23 in its maximum down position as shown in FIG. 6. To pick up the tool, gripper 43 is placed into the counter bore 46 at the top of the tool and expanded. Tool 11 is placed over holder 41 with the bolt head in socket 19 at the end of the push rod.

Gripper 43 pushes the tool downwardly toward bolt holder 41, sliding spring loaded jaws 22 and 23 relative to the rod and the top end of tie bolt 42. The bolt enters the tool and at the end of the pickup operation is held between spring loaded jaws 22 and 23 as shown in FIG. 8. The shank of the fastener is within the opposing V-shaped grooves 39 and 40 (FIGS. 4 and 5) and the fastener is centered for the insert operation. The top end of sliding rod 16, to the extent necessary, disappears into the gripper. A relatively short bolt 42 is shown in FIG. 8. FIG. 9 depicts the pickup of a much longer tie bolt 42' in which case the push rod 16 is retracted farther into the gripper. In FIG. 2, the length of the depending arms 14 and 15 as well as the length of longitudinally extending keyway 21 in movable rod 16 determine the longest fastener that can be handled.

The spring loaded jaws 22 and 23 hold the tie bolt in place while it is being moved from its pickup location to its insertion location. Actuator pin 44 (FIG. 7) is moved downwardly by the air piston, pushing the sliding rod 16 and tie bolt 42' down through the spring loaded jaws as shown in FIG. 10. The sliding rod engages the beveled surface 37 on the jaws, camming them apart as the rod decends. The jaws are free for limited swinging movment about pivot pins 32 and 33 and hold the bolt 42' until the sliding rod has moved farther down. The tie bolt is inserted into a hole in a motor end bell 47 and through aligned holes in flanges attached to the stator housing 48. When fully inserted into this assembly, the tie bolt is held from above by the wrench 16 and a nut is threaded onto the bolt and tightened from below. The tie bolt is accurately positioned for insertion because it is held in two places, at the bolt head by rod 16 and along the shank by jaws 22 and 23. Further information on the sequence of steps to assemble the small motor, the robotic machine, and the nut threading and tightening are given in application Ser. No. 169,024, filed July 17, 1980, now abandoned, and in continuation application Ser. No. 310,678 filed Oct. 13, 1981. D. C. Peroutky, "Dispenser for Screw Fastener Nuts", assigned to the same assignee.

A bolt, screw, or similar fastener can be picked up and inserted manually by tool 11. Spring loaded jaws 22 and 23 are placed over the fastener head, and as the entire tool is pushed down the bolt head slides along the beveled surface 38 at the lower end of the jaws, camming them apart so that the jaws slide past the fastener head and clamp on the shank of the fastener. To insert the fastener, sliding rod 16 is pushed down manually which in turn pushes the fastener down through the spring loaded jaws.

While the invention has been particularly shown and described with reference to a preferred embodiment thereof, it will be understood by those skilled in the art that the foregoing and other changes in form and details may be made therein without departing from the spirit and scope of the invention.

The invention claimed is:

1. A tool for picking up and inserting different length bolts, screws, and similar fasteners comprising:
    a tool housing;
    a sliding push rod in said housing which has a socket at its lower end to accept the head of the fastener;
    a pair of spring loaded jaws; and
    means for mounting said jaws on said housing to open and close and for limited swinging movement so as to pick up and hold the fastener between said jaws and to insert the fastener into an assembly in response to movement of said sliding push rod toward and between said jaws, said mounting means including a parallelogram linkage to which said jaws are pivoted.

2. A tool of claim 1 wherein said housing has a gripper section whereby the tool is adapted to be picked up by an assembly machine gripper, and wherein said sliding rod is adapted to be moved by an actuator on said gripper.

3. A tool for picking up and inserting different length tie bolts comprising:
    a tool housing having a gripper drum and a pair of depending arms;
    a sliding push rod/wrench at the center of said gripper drum which extends into said housing and has a socket at its lower end to accept the head of the tie bolt; and
    a pair of spring loaded jaws pivoted to parallelogram linkages which are in turn pivoted to guide bars attached to said housing arms, said jaws being mounted to open and close and to have limited swinging movement so as to pick up and hold the tie bolt between said jaws and to insert the tie bolt into an assembly in response to movement of said sliding push rod downward between said jaws to push the tie bolt down through said jaws.

4. The tool of claim 3 wherein said jaws have opposing beveled surfaces at both ends and have opposing V-shaped grooves to receive the shank of the tie bolt, and wherein the length of said sliding push rod and the length of said housing depend on the longest of the different length tie bolts to be picked up and inserted.

5. A system for automatically picking up and inserting different length bolts, screws, and similar fasteners comprising the combination of:
    a pickup and insert tool;
    a holder for the fasteners; and
    gripper means having a retractable actuator;
    said tool having a housing, a sliding push rod in said housing which has a socket at its lower end to receive the head of the fastener, a pair of spring loaded jaws, and means including parallelogram linkages to which said jaws are pivoted for mounting said jaws on said housing to open and close and for limited swinging movement;

said tool further having a gripper section by which the tool may be picked up and placed over said holder;

said gripper means moving said tool vertically downward to pick up and hold the fastener between said jaws, and said actuator then moving said sliding push rod toward and between said jaws to insert the fastener into an assembly.

6. The system of claim 5 wherein said jaws have beveled surfaces at both ends and have opposing V-shaped grooves to receive the shank of the fastener.

7. The system of claim 6 wherein the length of said housing and sliding push rod govern the longest fastener that can be picked up and inserted.

* * * * *